July 4, 1961
C. A. YOUNG
2,991,119
GLARE SHIELD AND SUN REFLECTOR
Filed Oct. 20, 1958
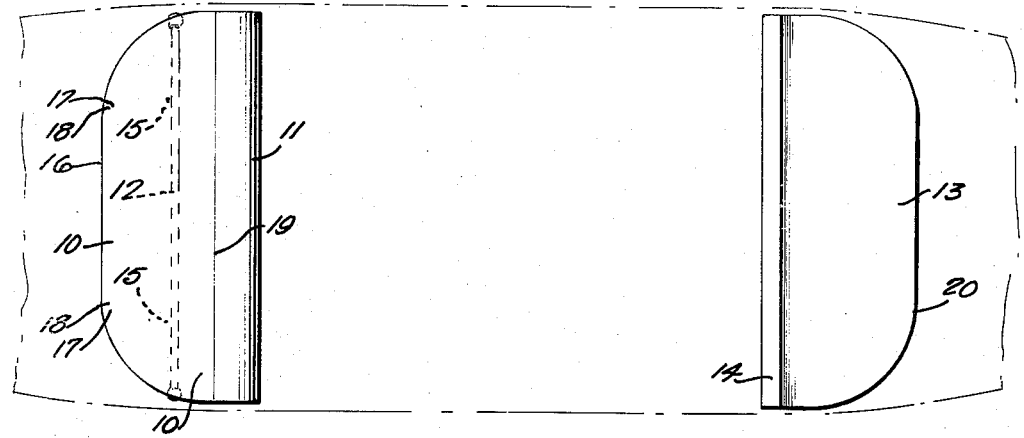
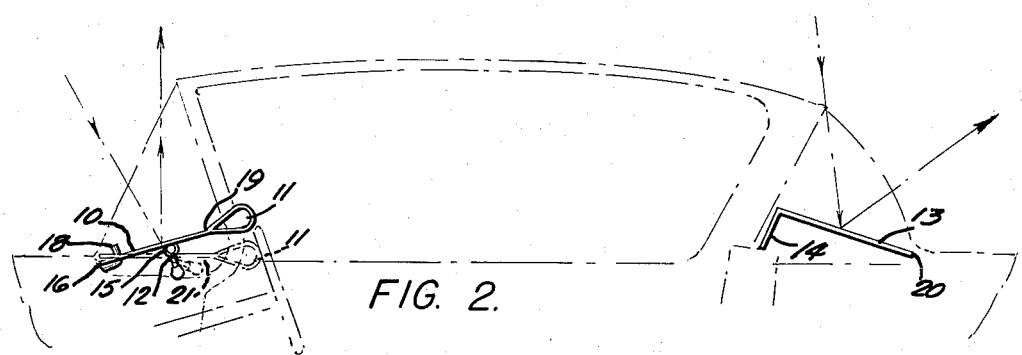
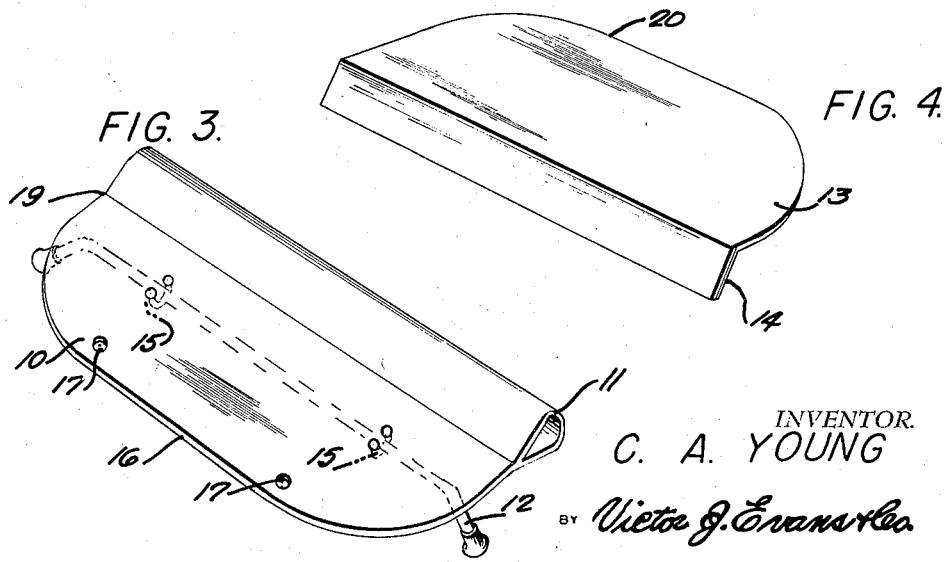
INVENTOR.
C. A. YOUNG
BY Victor J. Evans & Co.
ATTORNEYS

# United States Patent Office 2,991,119
Patented July 4, 1961

2,991,119
GLARE SHIELD AND SUN REFLECTOR
Clyde A. Young, 6054 SW. 33rd St., Miami, Fla.
Filed Oct. 20, 1958, Ser. No. 768,487
2 Claims. (Cl. 296—97)

This invention relates to glare and heat eliminating shields and other devices used in motor vehicles, and in particular, reflectors positioned on the cowl and inside of the windshield and also on the space between the upper edge of the back of the rear seat and rear window of a motor vehicle whereby the rays of the sun and also heat resulting from the rays are reflected back through the windshield and rear window eliminating glare and reducing heat resulting from the rays of the sun.

The purpose of this invention is to provide means in a motor vehicle for eliminating glare rays and reducing heat resulting from rays of the sun which may readily be installed in a motor vehicle without changing parts of the vehicle.

Various types of glare reflecting shields and other devices have been provided for use in combination with motor vehicles and although such devices are useful under certain conditions devices of this type have not been found successful for universal use and, consequently, very few vehicles are provided with glare eliminating shields and the like. It has been found that the most annoying glare rays are the rays resulting from the sun passing through the windshield and striking the upper surface of the cowl. Such rays not only produce a reflected image in the line of sight of the operator of the vehicle but also produce heat which, combined with heat from sun rays entering the rear window of the vehicle causes the temperature of the vehicle to be increased considerably while driving with a bright sun. With this thought in mind this invention contemplates glare and heat reflecting shields positioned over the cowl and on the space between the upper edge of the back of the rear seat of the vehicle and rear window whereby glare rays are reflected back through the windshield and rear window and wherein heat rays are returned or reflected out of the vehicle.

The object of this invention is, therefore, to provide a glare shield and sun reflector that may readily be positioned in motor vehicles now in use.

Another object of the invention is to provide a glare shield and sun reflector that may be provided in different patterns to accommodate motor vehicles of different manufacturers.

Another important object of the invention is to provide glare shields and sun reflectors for motor vehicles in which the devices are adjustable to compensate for different positions of the sun in relation to the vehicle.

A still further object of the invention is to provide glare shields and sun reflectors for motor vehicles in which the devices are of simple and economical construction.

With these and other objects and advantages in view the invention embodies a flat sheet of material designed to reflect rays of the sun and patterned to be positioned on the cowl inside of a windshield of a motor vehicle and another flat sheet of material having an elevating flange on the forward end and patterned to be positioned on the space between the upper edge of the back of the rear seat of the vehicle and lower edge of the rear window.

Other features and advantages of the invention will appear from the following description taken in connection with the drawing, wherein:

FIGURE 1 is a plan view illustrating the relative positions of the glare shield and sun reflector in a motor vehicle, associated parts of the vehicle being shown in broken lines.

FIGURE 2 is a side elevational view of the improved glare shield and sun reflector showing the devices incorporated in the body of a motor vehicle, the body of the vehicle being shown in broken lines.

FIGURE 3 is a perspective view illustrating the shield designed to be positioned upon the cowl inside of the windshield of the vehicle.

FIGURE 4 is a perspective view showing the sun reflector designed to be positioned on the space between the back of the rear seat and lower edge of the rear window of the vehicle.

Referring now to the drawing wherein like reference characters denote corresponding parts of the improved motor vehicle glare shield and sun and heat reflector of this invention includes a panel 10 having a loop 11 forming the rear edge and having an intermediate substantially U-shaped support 12 extending longitudinally of the panel 10, and pivotally mounted on the under surface thereof and positioned between the leading edge 16 and loop 11 of the panel 10, and an L-shaped body including a panel 13 having a web or flange 14 on the leading edge positioned on the ledge between the back of the rear seat and rear window of a vehicle in which the device is positioned.

The panel 10 may be formed of any suitable material for reflecting the sun's rays or rays of light and the upper surface may be white or the panel may be made of aluminum or any material capable of reflecting rays of light. The loop 11 is preferably made of a comparatively soft material to prevent injury to occupants of the front seat in case of a sudden stop wherein the occupant amy be thrown against the windshield or loop.

The support 12 is frictionally held in eyes 15 on the under surface of the panel, and the angle of the panel may be adjusted by swinging the support to any suitable position.

The under surface of the panel 10, and also the surface of the loop are preferably formed of a dull color to prevent light reflection and eye strain.

By adjusting the position of the support 12 the angle of the panel may be adjusted to compensate for height of the eyes of the operator of the vehicle and also to intercept all light rays, such as rays being reflected from the hood of the vehicle, below the line of sight.

The leading edge 16 of the panel is arcuate to compensate for the inner surface of a windshield and the edge is provided with openings 17 that are positioned to receive hooks 18 extended from the lower edge of the windshield frame.

The angle of the panel 13 at the rear of the vehicle is adjusted by the height or inclination of the flange 14 and this panel may also be provided with an arcuate rear edge 20 to correspond with the curvature of the rear window.

In the design shown the loop 11 extends from a point 19 and it will be understood that the loop or roll on the rear edge of the panel 10 may be of any suitable shape or design.

With the parts provided and installed as illustrated and described it will be appreciated that the shields reflect the sun's rays out of the car thereby reducing the air conditioning load by approximately 35% as shown by tests.

The shield 10 eliminates the glare from the cowl or hood of a motor vehicle and, consequently, eliminates the bright spot reflected from the cowl that assumes the position directly on the line of sight of the operator of the vehicle.

The shields may be patterned to correspond with motor vehicles of different manufacturers and the shields may be made of any suitable material and also of a suitable color.

The shield may also be lowered to a horizontal position as indicated by the dotted lines 21, as shown in FIGURE 2, when stopping at roadside stands to be used as a tray.

What is claimed is:

1. In a glare shield and sun reflector for motor vehicles the combination which comprises a panel having the upper surface thereof formed of a material for reflecting run rays exteriorily of the vehicle in which it is positioned, a loop of substantially soft material provided on one edge of said panel to prevent injury resulting from a passenger of the vehicle coming in contact with said panel, the opposite edge of said panel being of arcuate formation and said panel being provided with spaced parallel openings adjacent said last mentioned edge, hooked shaped members positioned in said openings to retain said panel in fixed position, said panel also having a longitudinally extending centrally located row of spaced pairs of openings, eyes inserted in said openings, a substantially U-shaped support member pivotally mounted in said eyes and said panel being adapted to be nested on a horizontally disposed part of a vehicle and inside of a window thereof with the arcuate edge of said panel in contact with said horizontally disposed part and said loop being adapted to be adjusted toward and away from said horizontally disposed part by reason of the pivotal movement of said support.

2. A glare shield and sun reflector comprising a body having a horizontally disposed panel and a longitudinally extending support positioned normal to the panel, a longitudinally extending loop on one edge of said panel, and the opposite edge of said panel being of arcuate formation, said panel being designed to nest on a horizontally disposed part of a vehicle and inside of a window thereof with the longitudinally extending loop on one edge of said panel being spaced from said horizontally disposed part and the opposite edge of said panel that is of arcuate formation being in contact with said horizontally disposed part, said panel being provided adjacent said opposite edge, with a pair of spaced openings, hook shaped members mounted in said openings to retain said panel in fixed position, said support being of substantially U-shaped formation and pivotally secured to the under-surface of said panel.

References Cited in the file of this patent

UNITED STATES PATENTS

| | | |
|---|---|---|
| 2,070,760 | Straith | Feb. 16, 1937 |
| 2,187,027 | Harvey | Jan. 16, 1940 |
| 2,207,224 | Meares | July 9, 1940 |
| 2,253,766 | Crowell | Aug. 26, 1941 |
| 2,289,144 | Rossell et al. | July 7, 1942 |
| 2,651,543 | Chonoski et al. | Sept. 8, 1953 |
| 2,736,374 | Iverson | Feb. 28, 1956 |
| 2,785,287 | Williams | Mar. 12, 1957 |
| 2,930,650 | Vosen | Mar. 29, 1960 |

FOREIGN PATENTS

| | | |
|---|---|---|
| 1,152,318 | France | Sept. 2, 1957 |
| 481,541 | Italy | June 3, 1953 |